United States Patent
Ehrenberg et al.

[11] Patent Number: 6,043,999
[45] Date of Patent: Mar. 28, 2000

[54] APPARATUS AND METHOD FOR CONTROLLING AN ELEVATOR POWER SUPPLY

[75] Inventors: Jürgen Ehrenberg, Braunschweig, Germany; Zhiping David Fan, Ebikon, Switzerland

[73] Assignee: Inventio AG, Hergiswil NW, Switzerland

[21] Appl. No.: 09/082,951

[22] Filed: May 21, 1998

[51] Int. Cl.[7] ................................... H02M 7/04
[52] U.S. Cl. .................................. 363/89; 363/125
[58] Field of Search ................... 363/81, 84, 89, 363/92, 125, 127, 128, 129

[56] References Cited

U.S. PATENT DOCUMENTS

| | | | |
|---|---|---|---|
| 4,387,421 | 6/1983 | Zach et al. | 364/148 |
| 4,423,477 | 12/1983 | Gurr | 363/54 |
| 4,456,871 | 6/1984 | Stich | 323/217 |
| 4,565,953 | 1/1986 | Espelage et al. | 318/345 |
| 4,670,831 | 6/1987 | Fauvet et al. | 363/87 |
| 4,876,468 | 10/1989 | Libert | 307/643 |
| 4,891,741 | 1/1990 | Slattery et al. | 363/35 |
| 5,235,504 | 8/1993 | Sood | 363/53 |
| 5,712,802 | 1/1998 | Kumar et al. | 364/557 |

*Primary Examiner*—Adolf Deneke Berhane
*Attorney, Agent, or Firm*—MacMillan, Sobanski & Todd, LLC

[57] ABSTRACT

A digital control in line angle coordinates for a regulated power input device in which the line angle ($\epsilon$) is determined from measured line voltages (U1M, U2M) by means of a coordinate transformation of the rotary field, in Cartesian coordinates and subsequent arctan calculation (ATAN). From this, under circumstances of a heavily disturbed line angle ($\epsilon$) the line frequency is computed. In this, under circumstances, the strongly varying frequency information is limited to a plausible band of variations before the frequency is filtered and a relatively smooth running line angle ($\epsilon$) can be calculated therefrom. In order to avoid an erroneous integration, the calculated line angle integrator is set at every phase-zero-crossing to the corresponding angle value. With this line angle ($\epsilon$), which is stable also in the case of line disturbances, the coordinate trnnsformations of the line alternating currents (I1M, I2M) into line angle direct currents (IMD, IMQ) is carried out, as well as the control direct current voltages (UMD_REF, UMQ_REF), into the pertaining control alternating voltage (U1R_REF, U2R_REF).

14 Claims, 7 Drawing Sheets

6,043,999

APPARATUS AND METHOD FOR CONTROLLING AN ELEVATOR POWER SUPPLY

BACKGROUND OF THE INVENTION

The present invention relates generally to an apparatus and a method for controlling an elevator power supply receiving alternating current input power.

In order to make optimal use of the electrical energy available, present-day elevator drives are equipped almost exclusively with modern, that is digitally controlled power electronic components. With the wide spread use of static inverters, three-phase regulators and frequency inverters, the problems of the supply network influence by supply network reaction have increased greatly in the last decade. In particular the use of diode bridges, three-phase regulating units and three-phase rectifiers with phase gate control as input circuits are the actual supply line noise sources because they have strong nonlinear flows.

The problems caused by supply line reactions occur mainly in the form of higher harmonics and intermediate harmonics in the voltages and currents of the supply line and in the consumption of reactive power (kilovar).

In elevator systems, the non-sinusoidal currents are caused by power electronic components, such as for instance by static frequency inverters, the input circuits of which consist either of uncontrolled rectifier bridges or of thyristors. These higher harmonics in the currents produce harmonic voltages in the impedances in the supply network which heterodyne with the sinusoidal 50/60 Hz line voltage and distort the same—this results frequently in a flattening of the sine wave peaks.

The higher harmonics in the voltage can be noticed in all electrical components supplied by this network and cause an additional load on the equipment of the customer and the network supplier (power company). In case the higher harmonic voltages exceed the immunity to distortion of the connected equipment, disturbances are caused in the latter.

For this reason the owner of a reliable supply network must consider not only the interest of its customers but also, for the sake of undisturbed network operation, consider that the higher harmonic voltages and currents in the network should not exceed certain limit values.

SUMMARY OF THE INVENTION

The present invention is therefore based on the problem of propose an apparatus and method for the control of an electric power feeding device that generates line reactions far below limit values.

The advantages of the present invention are that by the use of a digital control of the feeding device in network angular coordinates, the network reactions can be kept to a very low value and the control operates practically maintenance-free, because all control-technical parameters remain constant by the digitalization, that is, independent of the ambient temperature and the aging of constructional elements.

Furthermore, in this digital control there exists in every scanning step an absolute network angle information with a zero crossing recognition of every line phase, the calculation error of the line angle in heavily disturbed network voltages is limited. It is possible to transfer immediately an anticipatory control of the actual network values to the control voltages without a classical rise in the supply line voltage, without inducing high equalizing currents during switching on. It is also possible to feed the occasional, considerable, elevator drive braking energies back to the supply line. Besides that the control is extremely robust against all sorts of line disturbances. Finally it is possible to measure the load current of the dc-ink circuit and use it in the control of the compensation of the disturbance variable.

BRIEF DESCRIPTION OF THE DRAWINGS

The above, as well as other advantages of the present invention, will become readily apparent to those skilled in the art from the following detailed description of a preferred embodiment wn considered in the light of the accompanying drawings in which.

DESCRIPTION OF THE PREFERRED EMBODIMENT

Figure 1:
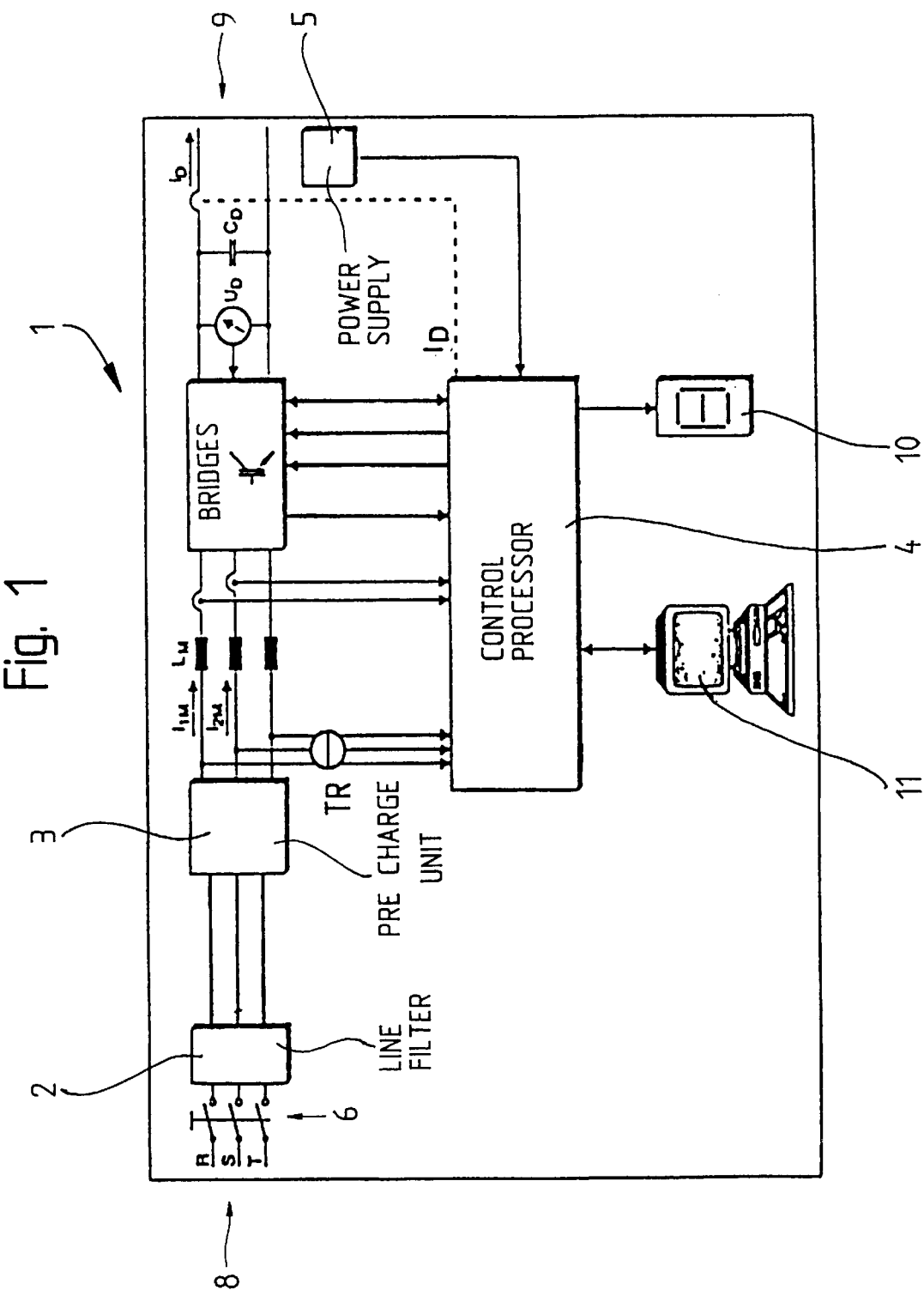
FIG. 1 is a schematic block diagram of hardware components and interfaces of a controlled input rectifier power supply in accordance with the present invention.

FIG. 1 is a schematic block diagram of hardware components and interfaces of a regulated input rectifier 1 operating as an electrical power input device, having an input 8 and an output 9, between a source of electrical power and a load. Alternating current electrical power, such as from a building power supply network, is available at the input 8 of the device 1 on a three-phase supply line having three phases R, S and T. The conductors of the supply line can be connected through a switch or a circuit breaker 6 to an input of a power line filter 2. An output of the filter 2 is connected to an input of a pre-charge unit 3. The pre-charge unit 3 has an output connected through three power line chokes $L_M$ to three half bridges 7 of the input rectifier 1 which bridges can be equipped with pairs of IGBT switches. These six switches are directly controlled by a pulse width modulator (not shown) of a control processor 4 connected thereto. An output of the half bridges 7 has a de-link capacitor $C_D$ connected across it in which capacitor a direct current voltage $U_D$ is stored for user loads connected to the same at the output 9. This dc-link voltage $U_D$ is measured with a VCO (voltage controlled oscillator) and integrated peripheral aided cycle duration measurements. The measured value is made available for the control of the control processor 4 in a peripheral register as a reciprocal digital value.

The control information is contained on a control card (not shown) in the control processor 4. The control processor 4 is a digital device and is supplied with electrical power from a separate power supply 5. The control algorithms in the control processor 4 require the measurement of two phase currents (for example $I_{1m}$ and $I^{2m}$) of the dc-link voltage $U_D$ and of the three supply line voltages. A load current $I_D$ of the dc-link can be measured optionally and be used in a dc-link voltage control (dashed line) for the compensation of a load step. The result of this is an even faster responding dc-link voltage in the case of load steps.

For reasons of isolation between the microelectronics in the control processor 4 and the supply line and dc-link potentials, which are greater by two orders of magnitude, optocouplers and a measurement transformer TR are used.

In order to be able to quickly obtain information about the state of the system, fifteen different system states are signaled by a 7-segment indicator 10 connected to an output of the control processor 4. A serial interface is provided in the control processor and is connected to a terminal 11 for changing the variables and parameters of the control, by way of an internal monitoring program. For the same reason, two D/A converters (not shown) can be provided for scanning and time synchronous output of variables of the state of the control software.

Many elevators with electric motor drives, which drives are equipped with thyristor current inverters or three phase regulators, take from the current supply network besides the useful real power also the reactive power. The current harmonics do not participate in the actual power used by the drive. The harmonics load the supply line only thermally and act therefore like a reactive current. One observes in static current inverters, besides the fundamental reactive power according to the equation $$Q_1 = 3 \cdot U \cdot I_1 \cdot \sin \phi_1$$

also the harmonic reactive power is present according to the equation $$Q_V = 3 \cdot U \cdot \sqrt{I_2 + I_3 + \ldots}$$

The total reactive power will be:

$$Q = \sqrt{Q_1 + Q_V}$$

The conduction of this reactive power causes transmission losses and is therefore uneconomical. The operator of an electrical power supply network demands from his consumer maintenance of the limiting values of the power factor.

With reactive power compensation by means of power capacitors it is possible to unload (or relieve) the supply lines, as the reactive power is no longer supplied by the line but is provided by the capacitors. In order to avoid over-compensation in elevator drives it is, and was, necessary to install a high cost rapidly controllable compensation installation, as the requirement of reactive power in the elevator drive is very variable depending on the state of motion.

The current leakage from a conducting semiconductor to another one occurs by way of a limited short-circuit (commutation). The spectrum of the harmonics, which are caused by the commutation can be very broad and can spread up into frequencies above 10 kHz.

Voltage variations of the power supply network in Europe are limited to a maximum of 10% (Norm EN 50 160). Outside of Europe, however, there are many smaller networks that exhibit voltage variations exceeding the 10% value. In order to assure the required motor voltage, it is necessary to employ either a compensation of the supply line voltage by the power feed equipment or by the degree of modulation (pulse width or PWM) of the static inverter.

Also transient overvoltages and voltage surges are frequent The normally oscillating or not oscillating overvoltages and voltage surges are very damped and have a duration of several milliseconds or less. The rise-time of transient overvoltages or voltage surges varies from less than a microsecond to several milliseconds.

As a consequence of transient overvoltages and voltage surges, it is possible that disturbances occur in the input circuit of the drive system. An uncontrolled diode bridge is insensitive to such disturbances. The controlled current inverters likewise have to remain stable in case of transient voltage variations for a duration of 10 milliseconds, that is half a supply cycle.

Finally, also occurring are phase steps due to the line switching. If the line for the supply of the elevator fails, the consumers are supplied within a few seconds from an emergency generating set. Which type of generating set is available is unknown in most cases. If the line is again operational, it changes over from the emergency line with a contactor to the regular (or normal) supply line after a normally adjustable time. This switchover can cause a rapid phase step for the consumer. The input device according to the present invention works also in a stable manner with phase changes of the line voltages.

The regulation of the input device 1 shown in the FIG. 1 is performed in a manner, that once connected to the existing supply line, it will automatically switch on or off depending on the switching-on or switching off conditions. Surges, phase shifts or asymmetries in the line voltage are tolerated- up to a given (or specified) limit, without leading to undesirable system conditions.

A drive unit for an elevator (not shown) is connected to the output 9 and is fed by the dc-ink voltage, which is generated by the regulated input rectifier power input device 1. In this case we have a device that is able to generate a dc-link voltage, which has a magnitude high above the peak voltage of the supply line (for example 700 V). It is the advantage of the controlled bridge rectifier 1, that the dc-link voltage is also constantly regulated at the load and only sinusoidal current is taken from the (three-phase) supply line. Consequently the input device 1 has to be sized only for the required active power. It is not necessary to foresee reserves for the line phase currents increased by reactive currents when sizing certain circuit elements-sensors, chokes, switches.

Figure 2:
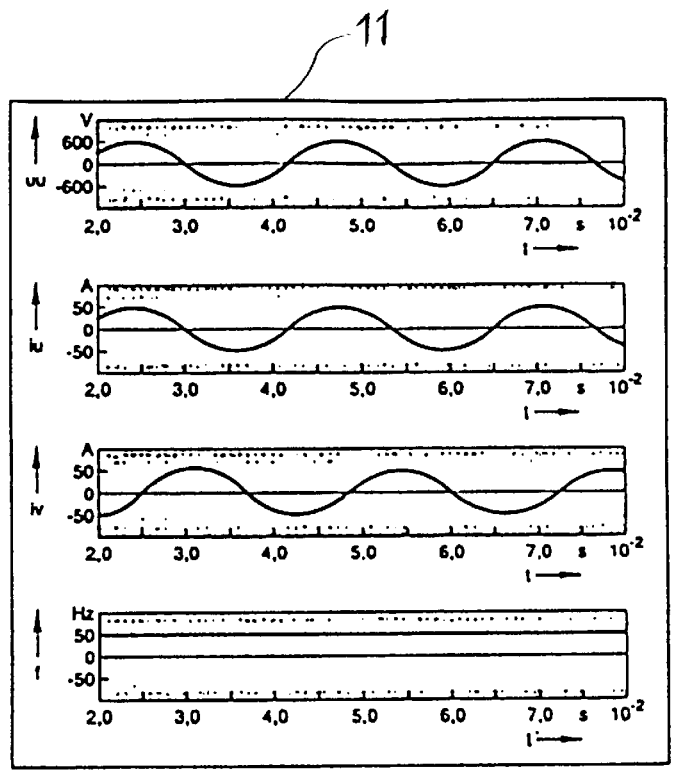
FIG. 2 shows current and voltage waveforms of the rectifier shown in the FIG. 1 during the supply of electrical power to a load.

There are shown in the FIG. 2 waveforms corresponding to the method according to the present invention, of the consumed line current at the inherent line voltage during undisturbed operation. The current (second waveform) is in phase and has the same shape as the line voltage (first waveform). This permits the description of the input device 1 in view of the line as a variable ohmic resistance. The power factor is one.

Figure 3:
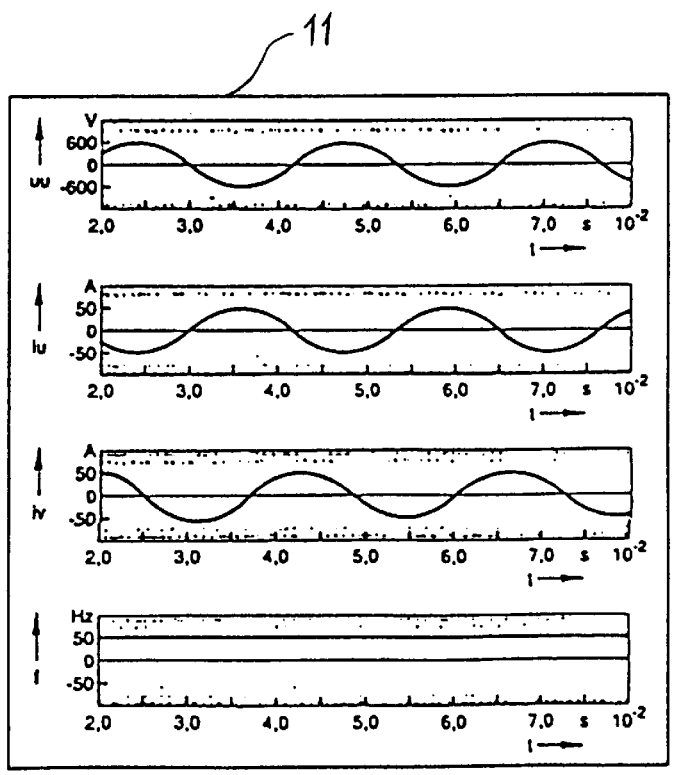
FIG. 3 shows current and voltage waveforms of the rectifier shown in the FIG. 1 during feed back of electrical power from the load.

If the elevator drive, for instance on braking, feeds energy back into the dc-link, the regulated input device 1 is capable of feeding this energy back into the supply line by controlling the dc-ink voltage, constant to its nominal value, for example 700 V. The harmonic content of the feedback current corresponds to the current at the input and thus, as shown in the FIG. 3, there is no quality difference. Here too the actual power is fed back into the supply line.

Figure 4:
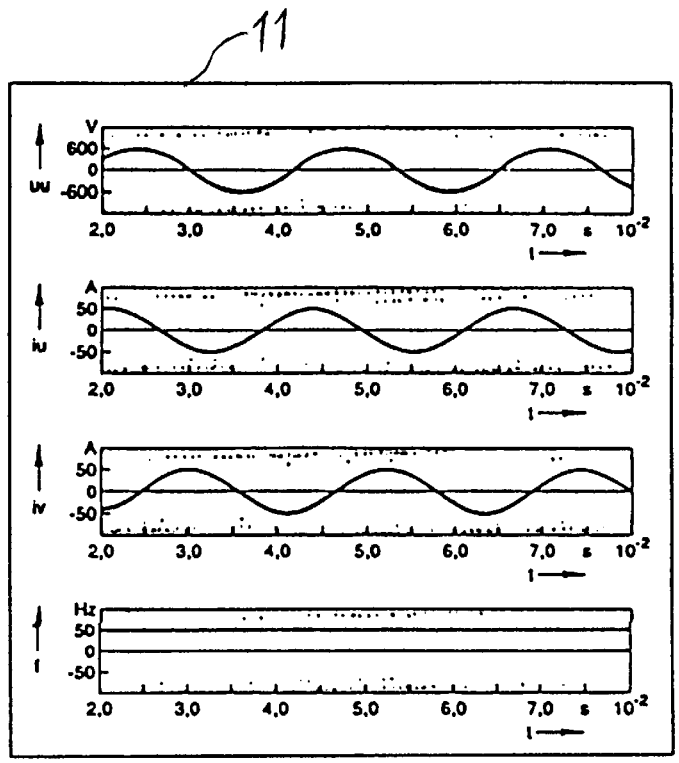
FIG. 4 shows current and voltage waveforms of the rectifier shown in the FIG. 1 for a predetermined phase relationship and amplitude.

Since the line current can be adjusted to any arbitrary phase position with respect to the supply line voltage, it is possible to use this device 1 also as phase shifter in the industry. In this way an industrial consumer knows the total share of reactive current, which he demands from the line due to conventional technology. According to the FIG. 4, the consumer is able to adjust with the input device 1 the phase position and amplitude of his current in such a way, that this reactive current component is either compensated capacitively or inductively and thus the connected value at the supplier (electricity network) can be reduced to the pure actual power requirement. This means cost saving because of power requirement reduction.

Figure 5:
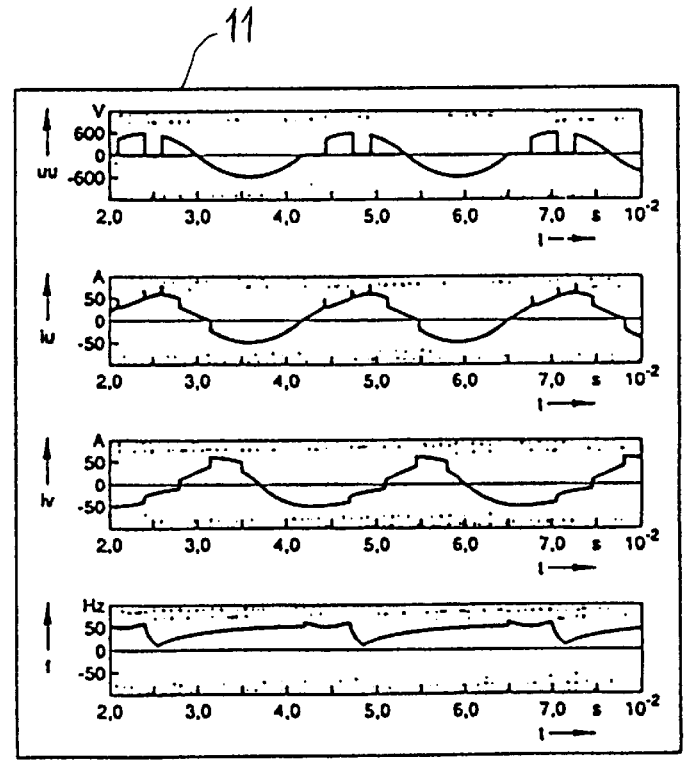
FIG. 5 shows current and voltage waveforms of the rectifier shown in the FIG. 1 during various types of disturbances.

The control of the input device 1, according to the present invention, distinguishes itself by special resistance of the implemented control with regard to deviations of the three-phase line from the normal line. In this way the stability of control is independent of supply line surges, phase shifts or amplitude difference between the supply line voltages, as is shown in the FIG. 5. In all cases an approximately sinusoidal current in phase to the momentary line voltage is at least assured. There are no uncontrolled excess currents that would damage the device or trip the fuses.

Figure 6:
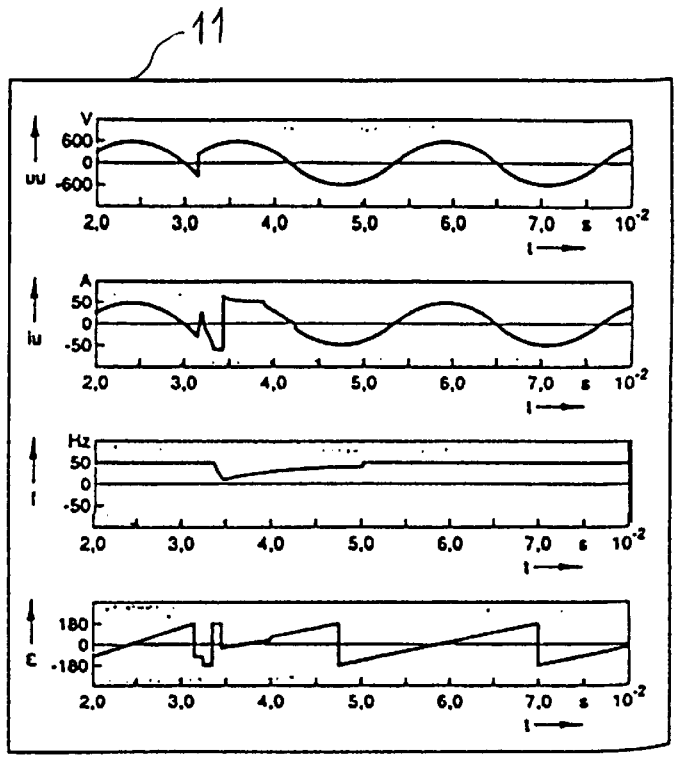
FIG. 6 shows current and voltage waveforms of the rectifier shown in the FIG. 1 during a rapid phase shift.

The FIG. 6 shows the current control quality during a simulated phase shift of 180 degrees in the supply network, as can occur for example after network failure and return (resumption of power) following switch-over from the emergency voltage system back to the supply line network (USV-installation). It can be seen, that the current continues to lie in the desired region with respect to phase position, amplitude and sinusoidal shape. It also becomes clear that the identified frequency deviates by the disturbances only for a short period of time from the ideal value and will return within a few rilliseconds.

Figure 7:
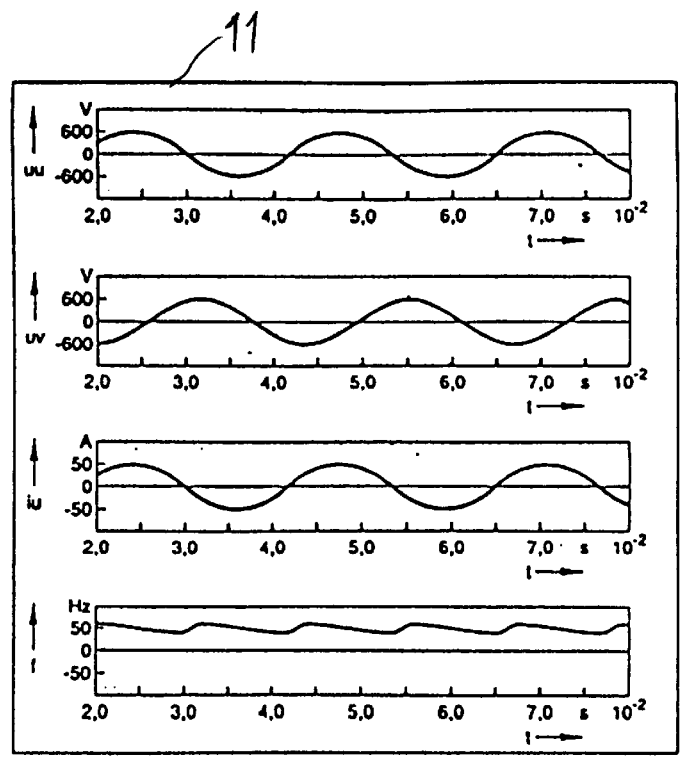
FIG. 7 shows current and voltage waveforms of the rectifier shown in the FIG. 1 for unsymmetrical or unbalanced supply line voltages.

The FIG. 7 shows the current control quality in a simulated amplitude difference of 15% between two supply network phases. Here too it can be seen, that the current control is hardly impaired by it.

Figure 8:
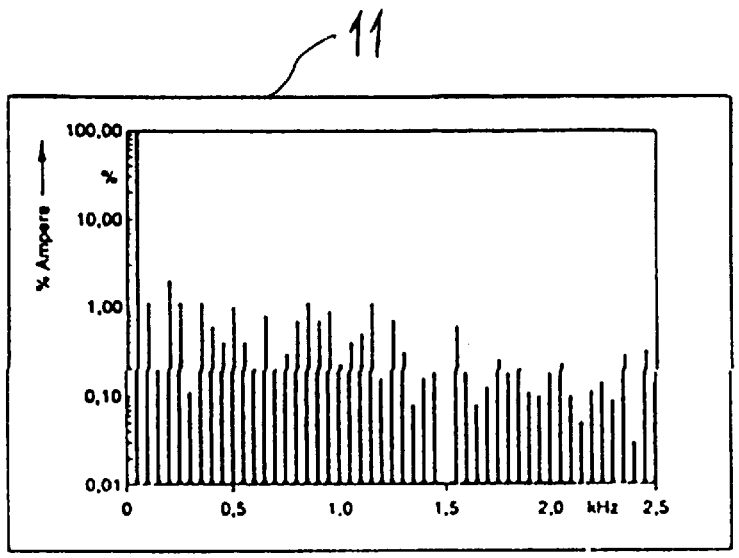
FIG. 8 shows a current waveform of the components of the harmonics in the rectifier shown in the FIG. 1.

By the control to sinusoidal currents the line reactions of the device 1 are considerably reduced, so that it can be stated practically, that the line is not changed in its voltage shape. In contrast to the uncontrolled bridge rectifiers existing in many devices, which level (harmonic content) the voltage peaks, because they can take current from the line only at the voltage peaks, the components of the harmonics lie way below the normal value as can be seen in the FIG. 8.

Figure 9:
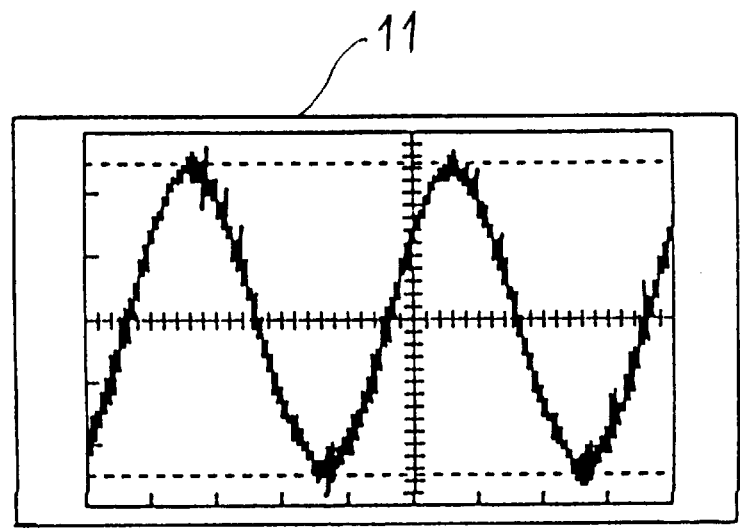
FIG. 9 shows a current waveform in the rectifier shown in the FIG. 1 with a line filter.

Shown in the FIG. 9 is the waveform of the current with a line filter. The sinusoidal shape is well reproduced. The current ripple of 16 kHz caused by the pulse width modulation is limited by the relatively small line chokes of 1 mH to only 5 to 10% of the nominal current. Bigger chokes however would increase the construction volume of the device considerably. However this ripple can be kept well away from the supply line by optimized line filters.

Figure 10:
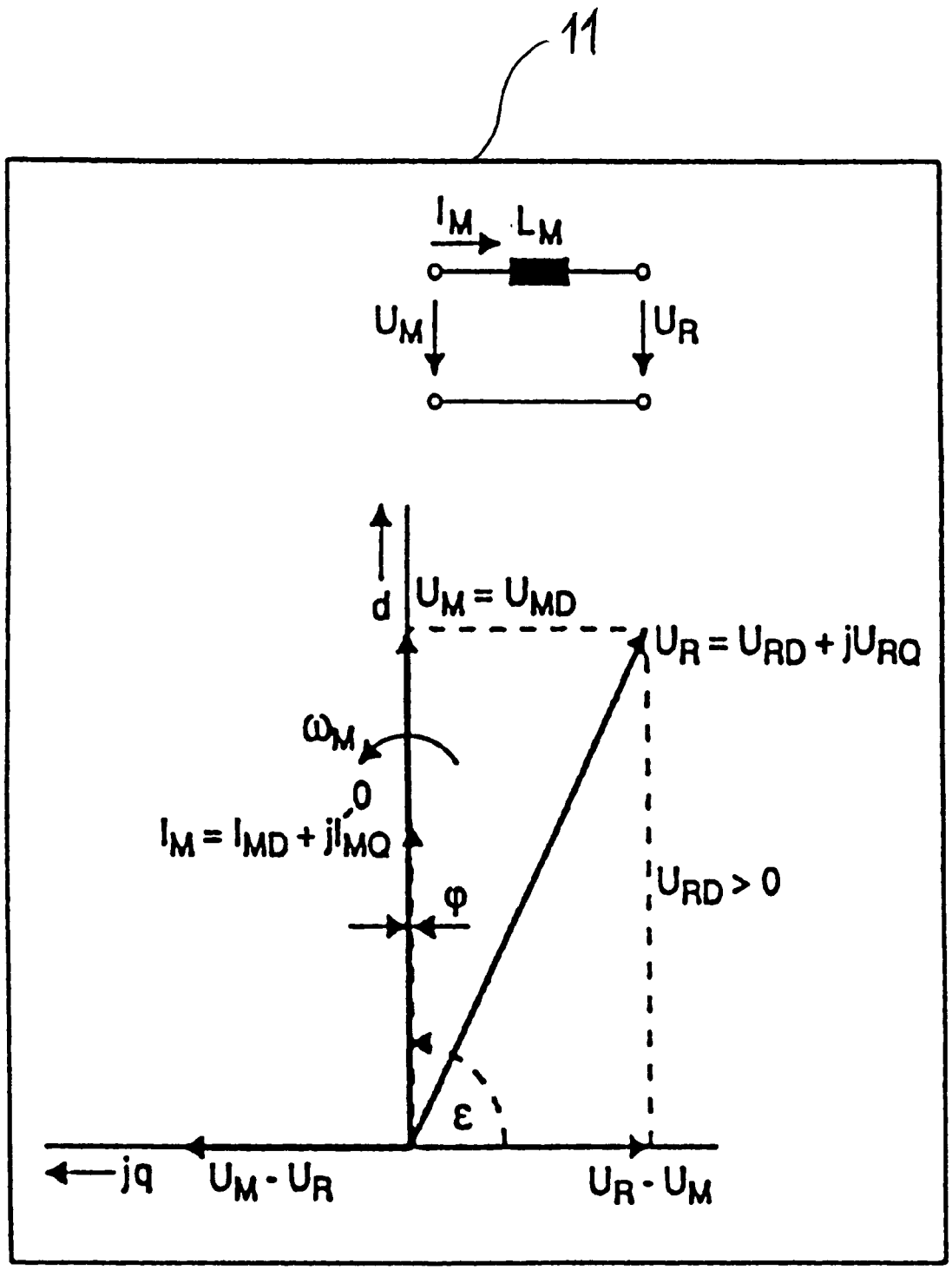
FIG. 10 is a vector diagram of the line voltages of the rectifier shown in the FIG. 1.
Figure 11:
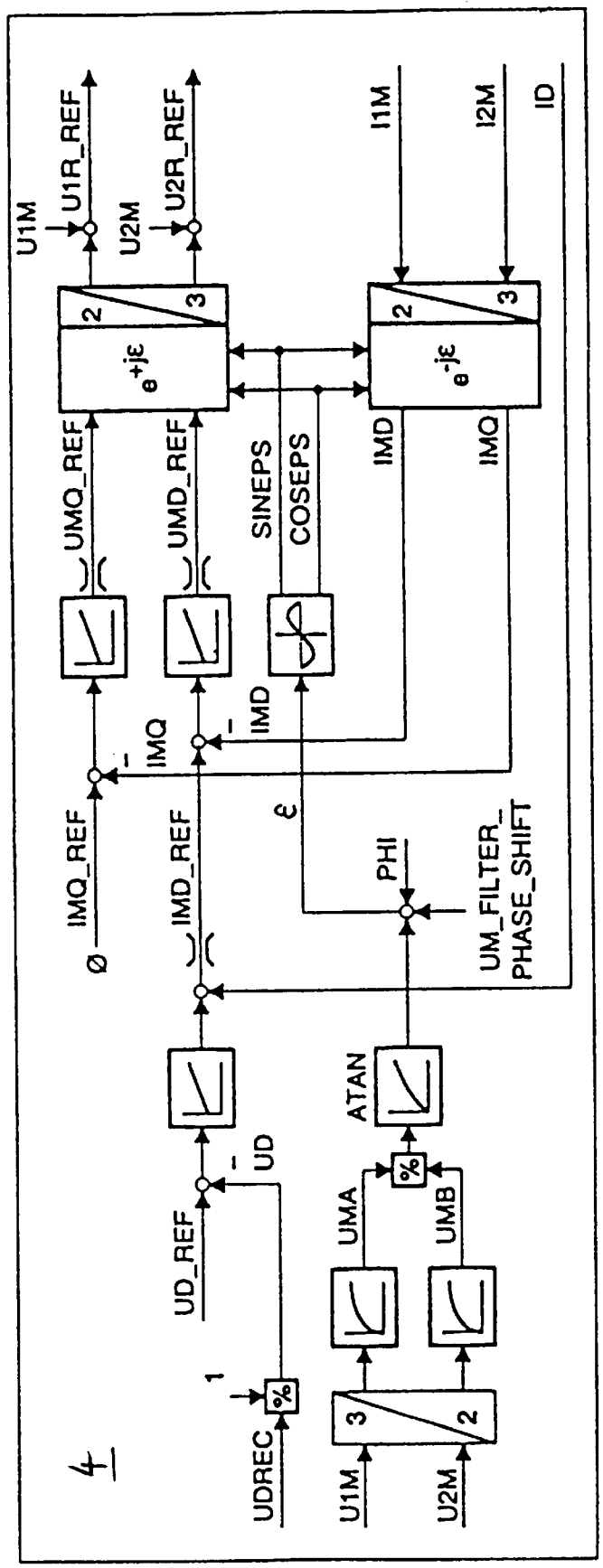
FIG. 11 is schematic block diagram of the digital control in the rectifier shown in the FIG. 1.

The FIG. 10 shows the vector values in the network, which are referred to a line angle ($\epsilon$). The controlled portion of the whole system consists only of the inductivity of the line chokes $L_M$ and the line voltage as a sinusoidal disturbance value. Corresponding to FIG. 10 the line phase current $I_M$ has to be controlled in phase with the corresponding phase voltage $U_M$. $U_R$ is the set voltage of the input device 1, by means of which the line phase current is controlled.

Looking at the line current control, it can be seen that the line voltage is the feed forward parameter in the line current control circuit. The vector diagram according to the FIG. 10 also shows the line angle ($\epsilon$) to which all further control values are referred. After a coordinate transformation, finally only devalues are controlled.

With the implemented control method according to the FIG. 1, the line angle ($\epsilon$) is obtained from the measured supply line voltages. These are filtered before further processing. The line angle ($\epsilon$) has a phase lag, which must be compensated before the coordinate transformation can be calculated with the angle. The phase shift of the filter changes with the line frequency.

Additionally, in this digital control according to the FIG. 1, is the line angle ($\epsilon$) evaluated from the measured line voltages U1M, U2M by means of a coordinate transformation from rotary field to Cartesian coordinates (resulting voltages UMA, UMB) and following arctan calculation ATAN and summation with the phase angle PHI between line current and line voltage and the compensation of the input filter phase shift UM. From the line angle ($\epsilon$), badly disturbed under certain circumstances, the supply line frequency is calculated. In this calculation the frequency information, which under circumstances is strongly oscillating (or even limited) is limited to a plausible degree of fluctuation, before the frequency is filtered and subsequently a relatively smoothly progressing line angle ($\epsilon$) can be computed. In order to avoid a wrong integration, the calculated line integrator is set to the corresponding angle value at every phase zero crossing. With this line angle ($\epsilon$) which is constant also in the case of line disturbances, the coordinate transformations are carried out with inclusion of the angle functions SINEPS, COSEPS of the line angle $\epsilon$ with the alternating line currents I1M, I2M into line angle direct currents IMD, IMQ and with the control direct current voltages UMD_REF, UMQ_REF into the control alternating voltages U1R_REF, U2R_REF. The extraction of the transformation angle takes place in this through the limited frequency information. The control dc voltages UMD_REF, UMQ_REF are formed from a comparison of the actual values of the line currents IMD, IMQ respectively with the nominal values of the line currents IMD_REF, IMQ_REF respectively and subsequent PI-control. The line frequency is then evaluated from the line angle information by differentiation and subsequent limitation of the evaluated frequency to a plausibility range.

For the calculation of the nominal line current value IMD_REF in line angle coordinates, the reciprocally measured actual dc-link voltage value UDREC is converted into the actual dc-link voltage UD and compared with the nominal dc-link voltage UD_REF and conducted by way of a PI-controller. Optionally it is possible to measure the load current ID of the dc-link to be used for the compensation of load steps. The consequence thereof is an even steeper dc-link voltage in the case of load transient Contrary to the known PLL-method, it is new that in every scanning step of the control according to the present invention there exists an absolute line angle information and that the line angle calculation is combined with a digital recognition of the zero-crossing of each network voltage phase. Similarly the actual line voltage values U1M, U2M are fed forward with regard to the control voltages U1R_REF, U2R_REF. The control can thereby go straight into the line without a classical peaking and without causing high balancing current during switching on.

As a result of the coordinate transformation, the current controllers work in the stationary state only with dc values.

A modulation of the load current would permit, in the case of load peaks, a very rapid regulation of UD in the dc-ink A measurement of the load current could also be replaced by a calculation of the load current from the internal values of the drive control with subsequent analog or digital transmission. The transformation of the line voltage makes possible the recognition of the direction of rotation of the line after a line failure or a system reset.

During voltage in-rushes the line angle ($\epsilon$) is further computed by extrapolation. The valuation of the zero-crossings of the supply line voltage prevents, arbitrarily increasing errors from integrating themselves upward, that means, that the transformation angle is secured against arbitrarily increasing errors by a combination with the zero-crossing recognition. Since the PI-current controllers work in line angle coordinates, they can hold in their integrators the disturbance parameter supply line voltage and have no problem to control the line current synchronously to the line voltage.

In accordance with the provisions of the patent statutes, the present invention has been described in what is considered to represent its preferred embodiment However, it should be noted that the invention can be practiced otherwise than as specifically illustrated and described without departing from its spirit or scope.

What is claimed is:

1. An apparatus for controlling the application of electrical power to a device comprising:

a rectifier device having an input for connection to a source of three-phase alternating current electrical power and an output for connection to a device and a plurality of switches for converting the electrical power at said input into direct current electrical power at said output; and a digital control processor device connected to said rectifier device for sensing two phase currents and three line voltages of the electrical power at said rectifier device input, said digital control processor device being responsive to said sensed currents and said sensed voltages for controlling said switches during scanning steps corresponding to half cycles of the electrical power at said rectifier device input, whereby said controlling is based upon absolute line angle information calculated by said digital control processor device during each of said scanning steps.

2. The apparatus according to claim 1 wherein said digital control processor device calculates said absolute line angle information by coordinate transformation from rotary field to Cartesian coordinates and subsequent arctan calculation.

3. The apparatus according to claim 2 wherein said digital control processor device calculates a frequency value of electrical power at said rectifier device input from said absolute line angle information by difference formation and subsequent limitation of said calculated frequency value to a predetermined plausible range of frequency values.

4. The apparatus according to claim 3 wherein said digital control processor device calculates a line integrator value, calculates a transformation angle value from said calculated frequency value and sets said line integrator value to transformation angle value in response to a zero crossing of the electrical power at said rectifier device input.

5. The apparatus according to claim 4 wherein said digital control processor device sets said line integrator value to said transformation angle value in response to every zero crossing of the electrical power at said rectifier device input.

6. The apparatus according to claim 1 wherein said digital control processor device precontrols the sensed voltages to generate control voltages for controlling said switches.

7. The apparatus according to claim 1 wherein said digital control processor device is connected to said rectifier device output for sensing a load current at said rectifier device output and said digital control processor device responds to said load current to control said rectifier device to compensate for disturbances in the electrical power at said rectifier device input.

8. A method of controlling the application of electrical power to a device comprising the steps of:

a. providing a rectifier device having an input for connection to a source of three-phase alternating current electrical power and an output for connection to a device and a plurality of switches for converting the electrical power at said input into direct current electrical power at said output;

b. providing a digital control processor device for controlling the switches;

c. sensing during each of a plurality of scanning steps phase currents and line voltages of electrical power at the rectifier device input;

d. calculating absolute line angle information from the sensed line voltages during each of the scanning steps; and e. controlling the switches with the digital control processor device in accordance with said absolute line angle information.

9. The method according to claim 8 wherein said step d. is performed by coordinate transformation from rotary field to Cartesian coordinates and subsequent arctan calculation.

10. The method according to claim 9 wherein the digital control processor device calculates a frequency value of electrical power at the rectifier device input from said absolute line angle information by difference formation and subsequent limitation of said calculated frequency value to a predetermined plausible range of frequency values.

11. The method according to claim 10 wherein the digital control processor calculates a line integrator value, calculates a transformation angle value from said calculated frequency value and sets said line integrator value to said transformation angle value in response to a zero crossing of the electrical power at the rectifier device input.

12. The method according to claim 11 wherein the digital control processor device sets said line integrator value to said transformation angle value in response to every zero crossing of the electrical power at the rectifier device input.

13. The method according to claim 8 wherein the digital control processor device precontrols the sensed voltages to generate control voltages for controlling the switches.

14. The method according to claim 8 including a step of connecting the digital control processor device to the rectifier device output and sensing a load current at the rectifier device output and wherein the digital control processor device responds to the load current to control the rectifier device to compensate for disturbances in the electrical power at the rectifier device input.

* * * * *